United States Patent [19]

Nonomura et al.

[11] 4,335,936
[45] Jun. 22, 1982

[54] MATRIX ELECTRODE STRUCTURE IN A MULTI-LAYER MATRIX TYPE LIQUID CRYSTAL DISPLAY

[75] Inventors: Keisaku Nonomura, Nara; Hisashi Uede, Yamatokoriyama; Tomio Wada; Toshiaki Takamatsu, both of Nara, all of Japan

[73] Assignee: Sharp Kabushiki Kaisha, Tokyo, Japan

[21] Appl. No.: 950,782

[22] Filed: Oct. 12, 1978

[30] Foreign Application Priority Data

Oct. 14, 1977 [JP] Japan .................. 52-123642
Mar. 23, 1978 [JP] Japan .................. 53-34429

[51] Int. Cl.³ .............................. G02F 1/133
[52] U.S. Cl. ...................... 350/335; 350/336; 340/784
[58] Field of Search ............... 350/335, 336; 340/784

[56] References Cited

U.S. PATENT DOCUMENTS

3,588,225  6/1971  Nicastro .................. 350/335
4,231,640  11/1980 Funada et al. ............ 350/336

Primary Examiner—Edward S. Bauer
Attorney, Agent, or Firm—Birch, Stewart, Kolasch & Birch

[57] ABSTRACT

A multi-layer, matrix type liquid crystal display panel is provided with an electrode structure which prevents the display dots from being overlapped with each other. Each of display patterns is provided through the utilization of a necessary number of line electrodes and a necessary number of column electrodes. According to the present invention, at least a necessary number of the line electrodes per display pattern unit are disposed as a single family in the front side cell or in the rear side cell. The respective families of the line electrodes are disposed alternatively in the front cell or in the rear cell, keeping the display dots within the same display pattern from being overlapped with respect to each other.

2 Claims, 10 Drawing Figures

MATRIX ELECTRODE STRUCTURE IN A MULTI-LAYER MATRIX TYPE LIQUID CRYSTAL DISPLAY

BACKGROUND OF THE INVENTION

The present invention relates to a matrix type liquid crystal display having orthogonally crossed strip electrodes or the so-called matrix electrode, and more particularly a matrix electrode structure.

Figure 1:
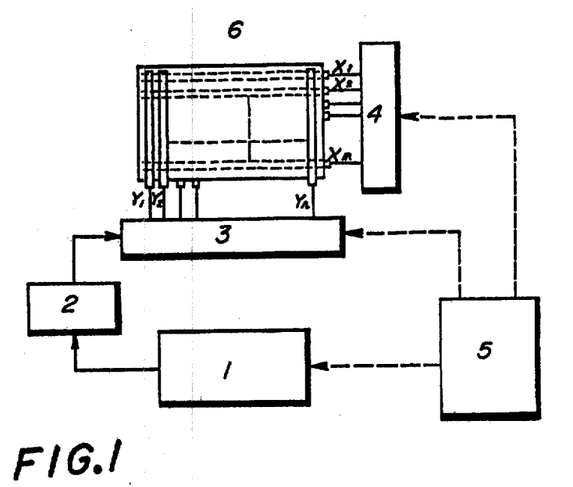
FIG. 1 is a block diagram of a driving circuit arrangement for a matrix type liquid crystal display.

A conventional drive technique for a matrix type liquid crystal display, for example, a line sequential drive as shown in FIG. 1 is well known. A main memory 1 stores characters, symbols, patterns or the like and an intelligence signal converter 2 converts data contained in the memory 1 into their associated display patterns. After those patterns are stored line by line into a buffer memory in a column driver 3, respective column electrodes $Y_1, Y_2, \ldots Y_n$ are supplied with those patterns. Line electrodes $X_1, X_2, \ldots X_m$ crossing the column electrodes, on the other hand, are sequentially enabled through a line driver, thereby displaying information contained in the buffer memory line by line. A control 5 provides an operation control for the line and column driver circuits. A liquid crystal display with a matrix type electrode is labeled 6. With the above mentioned matrix type liquid crystal display, the greater the number of lines, the higher the density of display. Although ensuring a higher degree of display quality, with an increase in the number of lines, a period of time where a signal may be applied during a line interval, that is, a duty ratio is relatively shortened thereby presenting a crosstalk problem. More particularly as far as liquid crystal displays are concerned, a satisfactory contrast of the display is not available because of dull threshold properties and slow responses. There are several attempts to overcome these problems.

(1) the development of liquid crystal material having more definite threshold properties.
(2) a matrix address scheme in the optimum conditions with an extended operating margin ($a = V_{on}/V_{off}$).
(3) the design of an electrode structure with a seemingly higher resolution.

Figure 2:
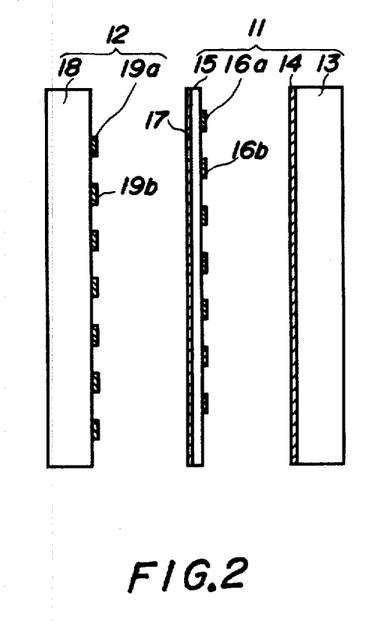
FIG. 2 is a cross sectional view of a prior art multilayer matrix type liquid crystal display when detached.

By way of example, as seen from FIG. 2, two layers of liquid crystal cells 11, 12 are provided with the front cell 11 carrying a predetermined number of column electrodes 14a, 14b, . . . on the front face of its front glass support 13 and a predetermined number of line electrodes 16a, 16b, . . . on its front face of its intermediate glass support 15. The rear cell 12 has a predetermined number of column electrodes 17a, 17b, . . . disposed on the rear face of the intermediate glass support 15 and a predetermined number of line electrodes 19a, 19b, . . . on the rear glass support 18. The line electrodes 16, 19 of the liquid crystal cells 11, 12 should be disposed so as not to overlap with each other, whereas the column electrodes 14, 17 are disposed to overlap with each other. The relationship between the line electrodes 16, 19 are best seen from FIG. 2.

However, the first two methods (1) and (2) cannot realize a remarkable increase in the number of energizable lines while there is no need for modifications in the cell structure. In contradistinction to these, the last method (3) is able to increase the number of energizable lines many times.

OBJECTS AND SUMMARY OF THE INVENTION

The present invention has an interest in the last method (3) with an intention to provide an electrode structure which is free of the effects of parallax and therefore enhances the degree of display quality.

Figure 3:
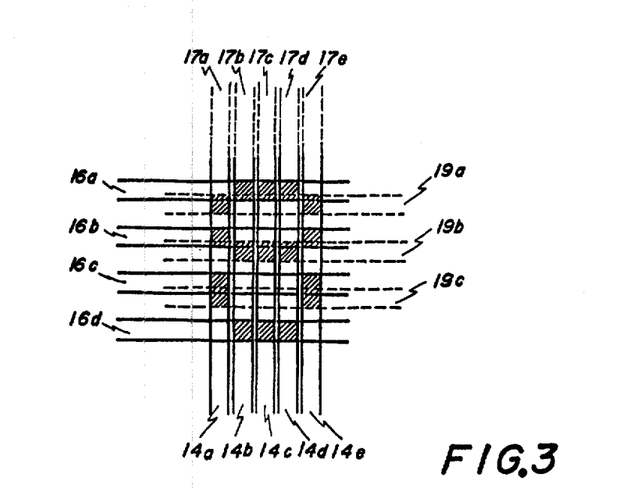
FIG. 3 is a diagram showing a certain display condition of the prior art device.

It is obvious that the multi-layer structure of the liquid crystal display of FIG. 2 causes a parallax problem. When the liquid crystal cell is viewed directly from the front thereof, display pattern dots for respective ones of the line and column electrodes can be viewed at the center (or intersection) of the electrode-to-electrode spacing as the viewer may expect. However, if the liquid crystal cell is viewed somewhat slantwise from the bottom, then the display pattern dots will overlap with one another as shown in FIG. 3 due to parallax between the front liquid crystal cell 11 and the rear liquid crystal cell 12, presenting difficulties in recognizing display patterns. In FIG. 3, the respective line electrodes 19a, 19b, . . . are deceptively shown to be in incorrect positions thereof when viewed slantwise from below. The hatched regions represent the dots where an electric field is applied.

These viewing difficulties are experienced particularly when viewed slantwise from above or from below due to the fact that the line electrodes are disposed alternatively with respect to each other in the front side cell and the rear side cell. Although the parallax problem can be improved to some extent through the use of a thinner intermediate glass support 15, this probably results in undesirable or insufficient mechanical strength when leading out terminals from the intermediate support 15.

As stated briefly above, the present invention provides an electrode structure which prevents the display dots from being overlapped with respect to each other. As is well known, each of display patterns is provided through the utilization of a necessary number of line electrodes and a necessary number of column electrodes. According to the present invention, at least a necessary number of the line electrodes per display pattern unit are disposed as a single family in the front side cell or in the rear side cell. The respective families of the line electrodes are disposed alternatively in the front cell or in the rear cell, keeping the display dots within the same display pattern from being overlapped with respect to each other.

BRIEF DESCRIPTION OF THE DRAWINGS

Other objects and many of the attendant advantages of the present invention will be readily appreciated as the same becomes better understood by reference to the following detailed description which considered in conjunction with the accompanying drawings, and wherein.

DETAILED DESCRIPTION OF THE INVENTION

Figure 4:
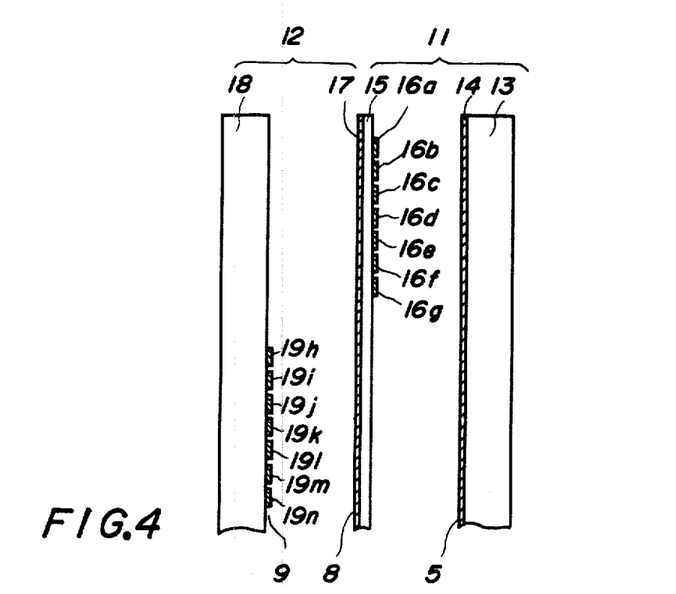
FIG. 4 is a cross-sectional view of one preferred form of the present invention.

Referring now to FIG. 4, there is illustrated a cross sectional view of one preferred form of a liquid crystal display of the present invention wherein the components in FIG. 4 are given the same numbers as in FIGS. 1 through 3 wherever possible to point up the close relationship. As clear from FIG. 4, the front side glass support 13 and intermediate glass support 15 constitute the front liquid crystal cell 11, wherein column electrodes 14a, 14b, . . . are carried on the inner face of the front side glass support 13 whereas the line electrodes 16 are carried on the front face of the intermediate glass support 15. In the case where display patterns are each displayed in the form of a five by seven matrix, it should be understood that seven line electrodes 16a-16g per display pattern unit are disposed as a single family on the front face of the intermediate glass support 15. Subsequently, the intermediate glass support 15 and the rear side glass support 18 constitute the rear side liquid crystal cell 12 wherein the column electrodes 17a, 17b, . . . are disposed on the rear side of the intermediate glass support 15 in registry with the above mentioned column electrodes 14a, 14b, . . . . Although the line electrodes 19 are disposed on the rear side glass support 18, seven line electrodes 19h-19n necessary for pattern unit are contiguously disposed as a family in the same way as above pursuant to the teachings of the present invention. In this way, the line electrodes are disposed family by family and alternatively with respect to each other as viewed from the front side of the liquid crystal cell 11 and the rear side of the liquid crystal cell 12.

The following description will set forth briefly the fabrication of the above described electrode structure.

Sodar glass of 3 mms thick is prepared for the front side glass support 13 and the rear side glass support 18 and the column electrodes 14 and the line electrodes 19 are deposited thereon by a well known method. Sodar glass with 0.3 mms of thickness is used as the intermediate glass support 15 and provided with the line electrodes 16 on the front face thereof and the column electrodes 17 on the rear face thereof by a conventional manner.

Figure 5:
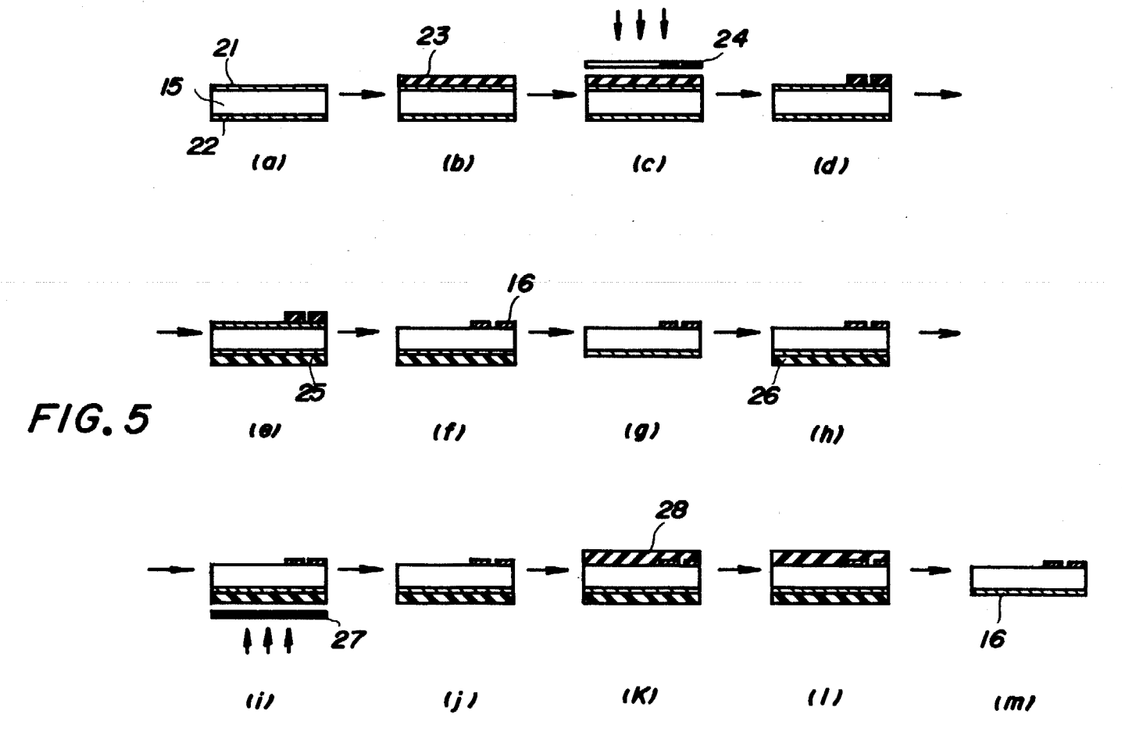
FIG. 5 is a flow diagram of the formation of an electrode on an intermediate glass support.

As seen from FIG. 5(a), transparent conductive films 21, 22 of $In_2O_3$ or $S_nO_2$ are deposited thoroughly on both sides of the glass support 15. Subsequently, to form the line electrodes on the front face of the support 15, photoresist 23 (for example, AZ-1350 by Shipley Co.) is deposited with the assistance of a spinner with a speed of 3000 RPM. After pre-baking, the glass support 15 is subject to light exposure via a photomasking 24 for development as shown in FIG. 5(c). In order to protect the transparent conductive film 22 on the rear side after post-baking, photoresist 25 (for example, AZ-1350 by Shipley Co.) is thoroughly deposited by a spinner (FIG. 5e). After being pre-baked and etched (FIG. 5f), the resist 25 is detached (FIG. 5g) and thereafter the glass support is cleaned. The line electrodes 16 are disposed on the front face of the glass support 15.

In forming the column electrodes 17 on the rear side of the glass support 15, the entire rear surface is covered with the same photoresist material 26 as above cf. FIG. 5h. The covering photoresist material 26 is pre-baked exposed to light via a photomasking 27 (FIG. 5i), developed (FIG. 5j) and covered with the same photoresist material 28 for protection of the front side electrodes 16 as seen from FIG. 5k. Thereafter, the photoresist material 28 is etched (FIG. 5l) and detached. The glass support is cleaned (FIG. 5m) to complete the formation of the column electrodes 17.

Figure 6:
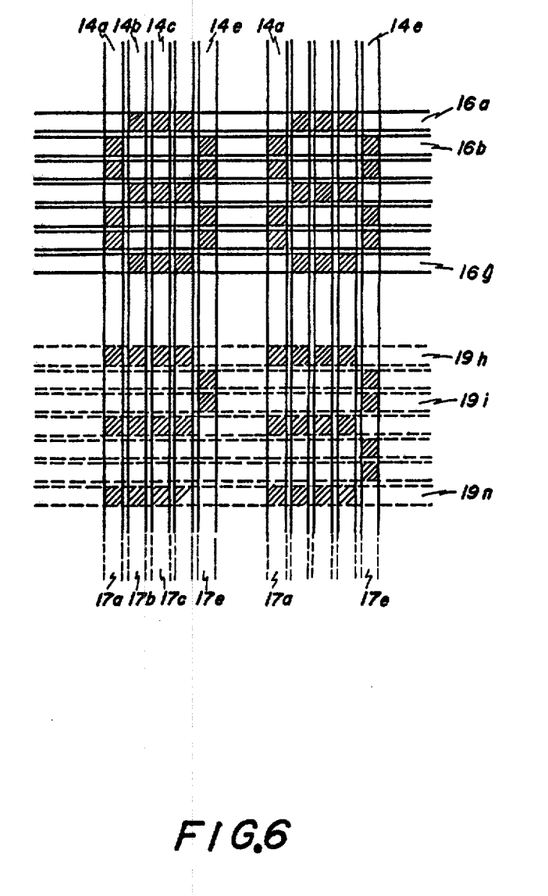
FIG. 6 is a diagram showing a certain display condition of the liquid crystal display of the present invention.

As stated above, according to the present invention, the respective display dots within the same display pattern are never overlapped when glanced slantwise from above or from below, overcoming difficulties as evidenced by FIG. 6. Strictly speaking, since the first line pattern is displayed, for example, on the first layer cell and the second line pattern on the second layer cell, the spacing between the first line pattern and the second line pattern will somewhat be different when viewed slantwise from above and from below. Provided, however, that the spacing is selected to be greater, these difficulties will be negligible from a standpoint of practical use.

It is obvious to those skilled that, although in the above embodiment the line electrodes are disposed pattern unit by pattern unit and alternatively in the front cell 11 and the rear cell 12, they may be disposed on alternate two or more pattern units.

Figure 7:
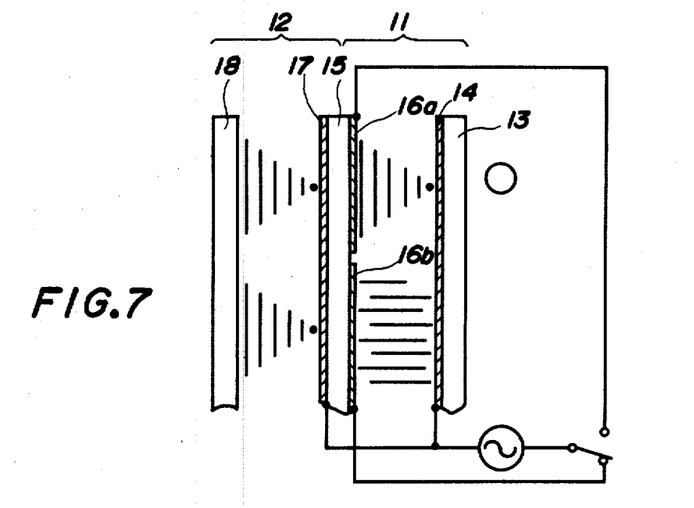
FIG. 7 is a schematic diagram of a two-layer type liquid crystal display when an electric field is applied.

Meanwhile, FIG. 7 shows a schematic diagram of a two-layer liquid crystal display when an electric field is applied. The ON/OFF switching of the liquid crystal cell 11 is effected between the electrode 14 and the electrodes 16a, 16b. Since the rear side cell constantly shows a twisted nematic molecular alignment at this time, display quality will decline where the molecular alignments are overlapped as labeled (x).

Figure 8:
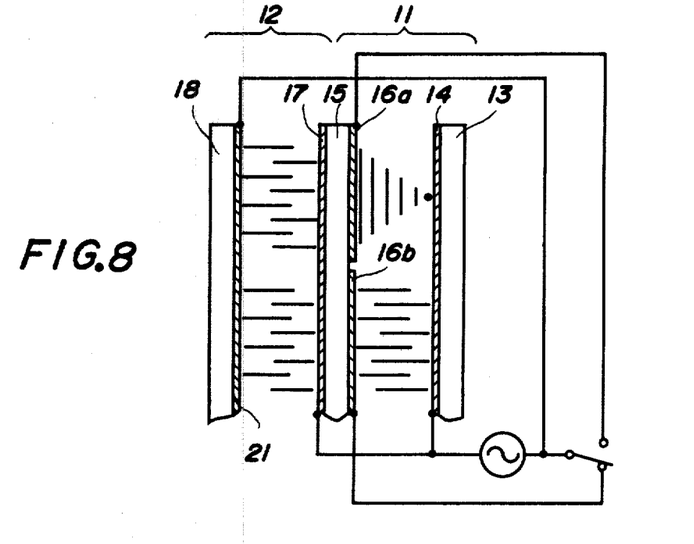
FIG. 8 is a schematic diagram of a two-layer type liquid crystal display in another preferred form of the present invention.

To this end, in another preferred form of the present invention as illustrated in FIG. 8, a third electrode 21 is provided at the back of the rear side cell 12 and is always supplied with an appropriate voltage despite a visual display condition in the front side cell 11. This third electrode causes the liquid crystal molecules to stand up. Therefore the twisted nematic alignment disappears and the two-layer cell takes the same form as a single-layer cell structure, ensuring substantially the same display quality and contrast.

Figure 9:
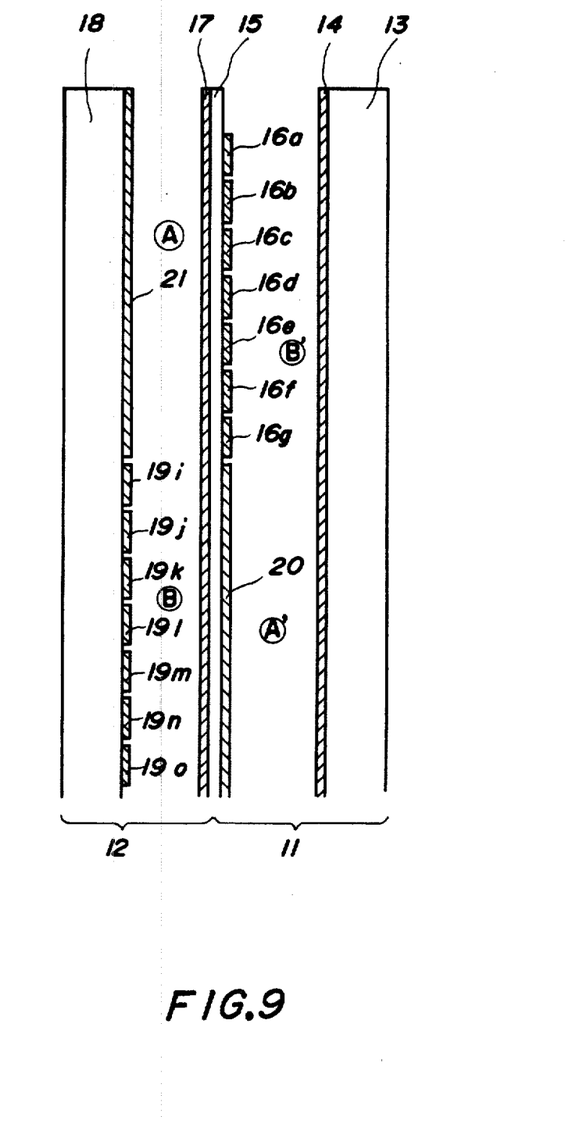
FIG. 9 details the other preferred form shown in FIG. 8.
Figure 10:
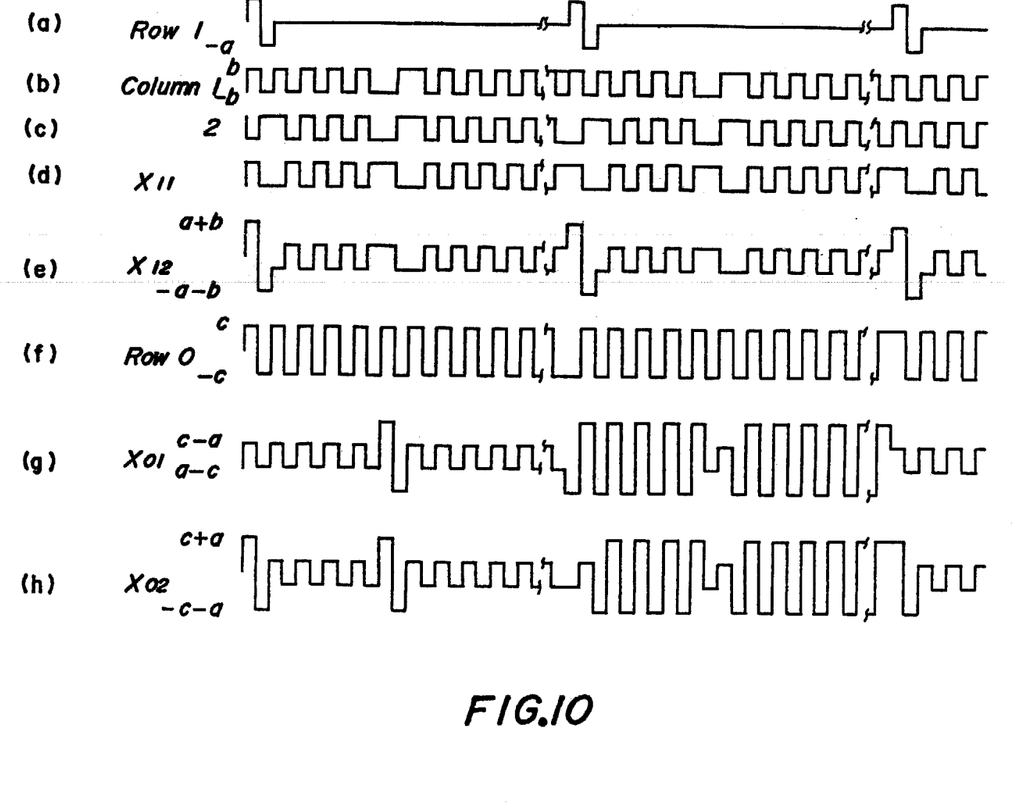
FIG. 10 is a time relationship among various signals appearing in the other preferred form of FIGS. 8 and 9.

The other preferred form of the present invention, detailed in FIG. 9, is enabled in the timing relationship as shown in FIG. 10. Voltage waveforms are shown in FIGS. 6(a), 6(b) and 6(c) in case of a well known 1/n bias method and wherein n=3. Row signals of FIG. 6(a) are applied to the line electrodes 16, 19 whereas column signals of FIGS. 6(b) and 6(c) are applied to the column electrodes 14, 17. Therefore, there is no variation as long as the enabling waveforms appearing in the areas (B) and (B)' of FIG. 9 are concerned. In the other preferred form, the signal which changes in phase from frame to frame as depicted in FIG. 10(f) is applied to the third electrodes 20, 21. As a result, the liquid crystal molecules present about the areas A and A' are subject to the influences of signals (g) and (h) corresponding to the potential differential between (b), (c) and (f) of FIG. 10. Though these signals (g) and (h) vary in the effective voltage value thereof according to the contents of displays, a sum of the effective voltage values is always kept constant with respect to the next frame period despite the contents of displays. The areas (A) and (A)' are supplied with a voltage extremely higher than the effective voltage which is applied to a segment to be turned on as shown in FIG. 6(e), so that the liquid crystal molecules thereabout stand perpendicular to the electrode surface. It becomes possible for the areas (B) and (B)' to conquer the influences of the opposite areas (A) and (A)' and thus prevent a decline in contrast ratio as experienced in the prior art two-layer device.

The invention being thus described, it will be obvious that the same may be varied in many ways. Such modifications are not to be regarded as a departure from the spirit and scope of the invention, and all such modifications are intended to be included within the scope of the following claims.

What we claim is:

1. A multilayer matrix type liquid crystal display having front and rear major surfaces, comprising:
    a first liquid crystal cell including a first plurality of column electrodes and a first group of row electrodes oriented substantially perpendicular to said first plurality of column electrodes, all of the row electrodes in said first liquid crystal cell being arranged within a first area and collectively defining said first group of row electrodes; and
    a second liquid crystal cell stacked over said first liquid crystal cell and including a second plurality of column electrodes and a second group of row electrodes oriented substantially perpendicular to said second plurality of column electrodes, all of the row electrodes in said second liquid crystal cell being arranged within a second area and collectively defining said second group of row electrodes,
    the first area and the second area, defining the first group of row electrodes and the second group of row electrodes, respectively, not overlapping in a direction substantially perpendicular to the major surfaces of said liquid crystal display.

2. A multilayer matrix type liquid crystal display in accordance with claim 1 wherein each of said first and second plurality of column electrodes is disposed approximately equi-distant from each other within the first and second liquid crystal cells, respectively.

* * * * *